(12) United States Patent
Araki et al.

(10) Patent No.: US 9,982,111 B2
(45) Date of Patent: *May 29, 2018

(54) ONE-PART MOISTURE-CURABLE POLYURETHANE COMPOSITION

(71) Applicant: The Yokohama Rubber Co., LTD.

(72) Inventors: Kiminori Araki, Hiratsuka (JP); Akio Ikeda, Hiratsuka (JP)

(73) Assignee: The Yokohama Rubber Co., LTD. (JP)

(*) Notice: Subject to any disclaimer, the term of this patent is extended or adjusted under 35 U.S.C. 154(b) by 119 days.

This patent is subject to a terminal disclaimer.

(21) Appl. No.: 14/899,532

(22) PCT Filed: Jun. 6, 2014

(86) PCT No.: PCT/JP2014/065058
§ 371 (c)(1),
(2) Date: Dec. 17, 2015

(87) PCT Pub. No.: WO2014/203750
PCT Pub. Date: Dec. 24, 2014

(65) Prior Publication Data
US 2016/0137815 A1    May 19, 2016

(30) Foreign Application Priority Data
Jun. 17, 2013    (JP) ................. 2013-126494

(51) Int. Cl.
| | | |
|---|---|---|
| *C08K 3/04* | (2006.01) | |
| *C08K 5/053* | (2006.01) | |
| *C08K 5/29* | (2006.01) | |
| *C08K 5/3492* | (2006.01) | |
| *C08G 18/48* | (2006.01) | |
| *C09J 175/06* | (2006.01) | |

(52) U.S. Cl.
CPC ...... *C08K 5/34924* (2013.01); *C08G 18/4812* (2013.01); *C08K 3/04* (2013.01); *C08K 5/053* (2013.01); *C08K 5/29* (2013.01); *C09J 175/06* (2013.01); *C08G 2190/00* (2013.01)

(58) Field of Classification Search
CPC ............ C08G 18/4812; C08G 2190/00; C08K 5/34924; C08K 3/04; C08K 5/053; C08K 5/29; C09J 175/06
See application file for complete search history.

(56) References Cited

U.S. PATENT DOCUMENTS

| | | | |
|---|---|---|---|
| 2004/0143055 A1 | 7/2004 | Nakata et al. | |
| 2004/0238116 A1 | 12/2004 | Inoue et al. | |
| 2016/0002511 A1* | 1/2016 | Araki ................. | C08K 3/04 524/590 |

FOREIGN PATENT DOCUMENTS

| | | |
|---|---|---|
| JP | H07-048428 | 2/1995 |
| JP | H10-036481 | 2/1998 |
| JP | 2003-113301 | 4/2003 |
| JP | 2004-168957 | 6/2004 |
| JP | 2005-075981 | 3/2005 |
| JP | 2006-131794 | 5/2006 |
| JP | 2006-131802 | 5/2006 |
| JP | 2008-038019 | 2/2008 |
| WO | WO 2003/031518 | 4/2003 |
| WO | WO 2006/082623 | 8/2006 |
| WO | WO 2011/114849 | 9/2011 |
| WO | WO 2014/097907 | 6/2014 |

OTHER PUBLICATIONS

International Search Report for Internatioanl Application No. PCT/JP2014/065058 dated Sep. 9, 2014, 4 pages, Japan.

* cited by examiner

*Primary Examiner* — Patrick D Niland
(74) *Attorney, Agent, or Firm* — Thorpe North & Western

(57) ABSTRACT

A one-part moisture-curable polyurethane composition according to the present technology comprises: a urethane prepolymer (A), a crosslinking agent (B), carbon black (C) and a catalyst (D). The crosslinking agent (B) is at least one type selected from the group consisting of isocyanurate of hexamethylene diisocyanate (b1), allophanate of hexamethylene diisocyanate (b2), a reaction product of hexamethylene diisocyanate with trimethylolpropane (b3), and a reaction product of hexamethylene diisocyanate with glycerin (b4). The content of the crosslinking agent (B) is from 8 to 20 parts by mass per 100 parts by mass of the urethane prepolymer (A).

1 Claim, No Drawings

ONE-PART MOISTURE-CURABLE POLYURETHANE COMPOSITION

TECHNICAL FIELD

The present technology relates to a one-part moisture-curable polyurethane composition.

BACKGROUND

Various urethane resin compositions have been widely used as sealing agents, adhesive agents, and the like.

As such urethane resin compositions, two-part type compositions containing a polyol compound and an isocyanate compound, and one-part type compositions that are curable by moisture in the air or the like have been known. However, from the perspective of ease in handling that does not require mixing/adjusting the composition on site when the composition is used, or the like, use of one-part moisture-curable polyurethane compositions has been increasing recently.

For example, Japanese Unexamined Patent Application No. 2004-168957A describes "a one-part moisture-curable polyurethane composition comprising: an isocyanate silane compound, the isocyanate silane compound being a reaction product of a compound, which has at least three isocyanate groups and which is obtained by reacting trimethylolpropane with diisocyanate compound, with a secondary aminosilane having a specific structure; and a urethane prepolymer".

Furthermore, Japanese Unexamined Patent Application Nos. 2006-131794A and 2006-131802A describe a one-part moisture-curable urethane composition comprising, relative to a composition prepared in advance containing a predetermined urethane prepolymer, filler, and plasticizer: "a compound (A) obtained by reacting a compound, obtained by reacting trimethylolpropane with bifunctional isocyanate in a manner that the equivalent weight proportion of NCO groups relative to OH groups is from 0.8 to 1.5, with a compound, having an imino group in which an aryl group is directly bonded to a nitrogen atom and having a hydrolyzable silyl group, in a manner that the equivalent weight proportion of NCO groups relative to NH groups is from 1.8 to 3.5"; "a compound (B) obtained by reacting a compound that is at least one type selected from the group consisting of isocyanurates and biurets of bifunctional isocyanate and compounds obtained by reacting bifunctional isocyanate with triol, with a compound, having an imino group in which an aryl group is directly bonded to a nitrogen atom and having a hydrolyzable silyl group, in a manner that the equivalent weight proportion of NCO groups relative to NH groups is from 1.8 to 3.5"; and "a compound (C) that is at least one type selected from the group consisting of isocyanurates and biurets of bifunctional isocyanate and compounds obtained by reacting bifunctional isocyanate with triol".

Furthermore, Japanese Unexamined Patent Application No. 2008-038019A describes "a one-part moisture-curable urethane resin composition comprising: a urethane prepolymer (A); a compound (B) obtained by reacting at least one type of modified hexamethylene diisocyanate selected from the group consisting of reaction products of hexamethylene diisocyanate and trimethylolpropane, biurets of hexamethylene diisocyanate, and isocyanurates of hexamethylene diisocyanate, with an imino group-containing alkoxysilane; a polymer (C) having a particular structural unit; and a catalyst (D).

However, it was found that, depending on the types or contents of compounds other than the urethane prepolymer and the filler (e.g. isocyanate silane compound in Japanese Unexamined Patent Application No. 2004-168957A, or the like), at least one physical property among shear modulus, adhesion under high-temperature high-humidity environments, or storage stability may be deteriorated with conventionally known one-part moisture-curable polyurethane compositions described in Japanese Unexamined Patent Application Nos. 2004-168957A, 2006-131794A, 2006-131802A and 2008-038019A, or the like.

SUMMARY

The present technology provides a one-part moisture-curable polyurethane composition which has a high shear modulus, exhibits excellent adhesion under high-temperature high-humidity environments, and has good storage stability.

A one-part moisture-curable polyurethane composition having a high shear modulus, exhibiting excellent adhesion under high-temperature high-humidity environments, and having good storage stability can be obtained by blending a particular amount of predetermined crosslinking agent relative to an amount of urethane prepolymer. Specifically, the present technology may include the following features.

(1) A one-part moisture-curable polyurethane composition comprising: a urethane prepolymer (A), a crosslinking agent (B), carbon black (C), and a catalyst (D);

the crosslinking agent (B) being at least one type selected from the group consisting of isocyanurate of hexamethylene diisocyanate (b1), biuret of hexamethylene diisocyanate (b2), a reaction product of hexamethylene diisocyanate with trimethylolpropane (b3), and a reaction product of hexamethylene diisocyanate with glycerin (b4); and a content of the crosslinking agent (B) being from 8 to 20 parts by mass per 100 parts by mass of the urethane prepolymer (A).

(2) The one-part moisture-curable polyurethane composition according to (1) above, where the crosslinking agent (B) is a combination of the isocyanurate (b1) and the reaction product (b4).

As described below, a one-part moisture-curable polyurethane composition which has a high shear modulus, exhibits excellent adhesion under high-temperature high-humidity environments, and has good storage stability can be provided according to the present technology.

The one-part moisture-curable polyurethane composition of the present technology (hereinafter, simply referred to as "polyurethane composition of the present technology") is a one-part moisture-curable polyurethane composition containing a urethane prepolymer (A), a crosslinking agent (B), carbon black (C), and a catalyst (D).

Now, the urethane prepolymer (A), the crosslinking agent (B), the carbon black (C), and the catalyst (D), as well as various additives that may be contained as desired, or the like will be described in detail.

Urethane Prepolymer (A)

The urethane prepolymer (A) used in the polyurethane composition of the present technology can be a conventionally known urethane prepolymer that is also used in a typical one-part polyurethane composition. For example, a reaction product, obtained by reacting a polyisocyanate compound with an active hydrogen compound having at least two active hydrogen groups in a molecule in a manner that the amount of the isocyanate group is in excess relative to the amount of the active hydrogen group, or the like can be used.

Furthermore, the urethane prepolymer (A) may contain from 0.5 to 5% by mass of NCO groups at the molecular terminals.

Polyisocyanate Compound

The polyisocyanate compound used upon producing the urethane prepolymer (A) is not particularly limited as long as the polyisocyanate compound has two or more isocyanate groups in a molecule.

Specific examples of the polyisocyanate compound include aromatic polyisocyanates such as TDI (e.g. 2,4-tolylene diisocyanate (2,4-TDI) and 2,6-tolylene diisocyanate (2,6-TDI)), MDI (e.g. 4,4'-diphenylmethane diisocyanate (4,4'-MDI) and 2,4'-diphenylmethane diisocyanate (2,4'-MDI)), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI), and triphenylmethane triisocyanate; aliphatic polyisocyanates such as hexamethylene diisocyanate (HDI), trimethylhexamethylene diisocyanate (TMHDI), lysine diisocyanate, and norbornane diisocyanate (NBDI); alicyclic polyisocyanates such as transcyclohexane-1,4-diisocyanate, isophorone diisocyanate (IPDI), bis(isocyanate methyl)cyclohexane ($H_6$XDI), and dicyclohexylmethane diisocyanate ($H_{12}$MDI); carbodiimide-modified polyisocyanates thereof; isocyanurate-modified polyisocyanates thereof; and the like.

Such a polyisocyanate compound may be used alone, or a combination of two or more types of these polyisocyanate compounds may be used.

Among these, from the perspectives of achieving even better adhesion under high-temperature high-humidity environments and even higher shear modulus of the polyurethane composition of the present technology that contains the resulting urethane prepolymer (A), the polyisocyanate compound is preferably an aromatic polyisocyanate, more preferably TDI and MDI, and even more preferably MDI.

Active Hydrogen Compound Having at Least Two Active Hydrogen Groups in One Molecule The active hydrogen compound having at least two active hydrogen groups in a molecule that is used upon producing the urethane prepolymer (A) is not particularly limited.

Polyol compounds having two or more hydroxy (OH) groups in a molecule, polyamine compounds having two or more amino group(s) and/or imino group(s) in a molecule, and the like are preferably exemplified as the active hydrogen compound described above. Among these, a polyol compound is more preferable.

The polyol compound is not particularly limited with respect to its molecular weight, skeleton, and the like as long as the polyol compound is a compound having two or more OH groups, and specific examples thereof include low-molecular-weight polyhydric alcohols, polyether polyols, polyester polyols, other types of polyols, polyol mixtures thereof, and the like.

Specific examples of the low-molecular-weight polyhydric alcohols include low-molecular-weight polyols such as ethylene glycol (EG), diethylene glycol, propylene glycol (PG), dipropylene glycol, 1,3-butanediol, 1,4-butanediol, pentanediol, neopentyl glycol, hexanediol, cyclohexanedimethanol, glycerin, 1,1,1-trimethylolpropane (TMP), 1,2,5-hexanetriol, and pentaerythritol; sugars such as sorbitol; and the like.

As the polyether polyols and polyester polyols, compounds derived from the low-molecular-weight polyhydric alcohols are typically used, but in the present technology, compounds derived from aromatic diols, amines, and alkanolamines described below may also be favorably used.

Here, specific examples of the aromatic diols include resorcin (m-dihydroxybenzene), xylylene glycol, 1,4-benzene dimethanol, styrene glycol, 4,4'-dihydroxyethyl phenol; and compounds having bisphenol skeletons of a bisphenol A structure (4,4'-dihydroxyphenylpropane), a bisphenol F structure (4,4'-dihydroxyphenylmethane), a brominated bisphenol A structure, a hydrogenated bisphenol A structure, a bisphenol S structure, or a bisphenol AF structure described below; and the like.

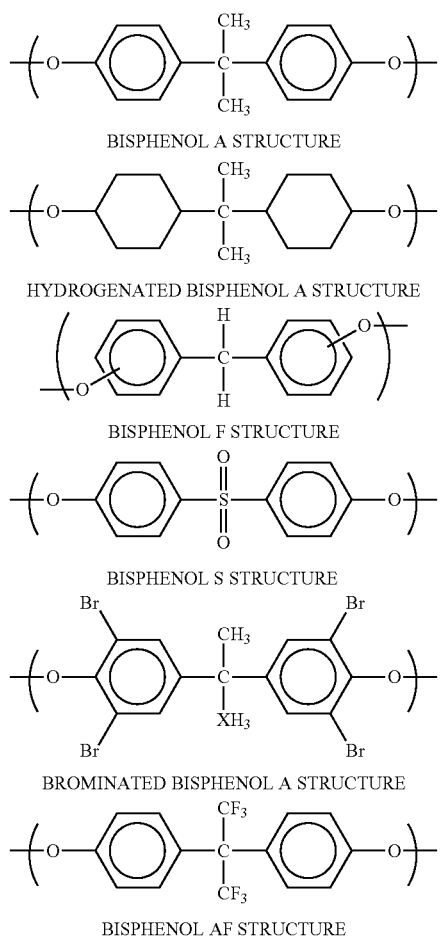

BISPHENOL A STRUCTURE

HYDROGENATED BISPHENOL A STRUCTURE

BISPHENOL F STRUCTURE

BISPHENOL S STRUCTURE

BROMINATED BISPHENOL A STRUCTURE

BISPHENOL AF STRUCTURE

Additionally, specific examples of the amines include ethylenediamine, hexamethylenediamine, and the like. Specific examples of the alkanolamines include ethanolamine, propanolamine, and the like.

Examples of the polyether polyols include polyols obtained by adding at least one type selected from styrene oxide, alkylene oxides such as ethylene oxide, propylene oxide, butylene oxide (tetramethylene oxide), and tetrahydrofuran, or the like, to at least one type selected from the compounds that are exemplified as the low-molecular-weight polyhydric alcohols, the aromatic diols, the amines, and the alkanolamines described above; and the like.

Specific examples of the polyether polyol include polyethylene glycol, polypropylene glycol (PPG), polypropylene triol, ethylene oxide/propylene oxide copolymers, polytetramethylene ether glycol (PTMEG), polytetraethylene glycol, sorbitol polyol, and the like.

Likewise, examples of the polyester polyol include the condensation products (condensed polyester polyols) of any of the low-molecular-weight polyhydric alcohols, the aromatic diols, the amines, or the alkanolamines with a polybasic carboxylic acid; lactone polyols; polycarbonate polyols; and the like.

Specific examples of the polybasic carboxylic acid which may be used here to form the condensed polyester polyol include glutaric acid, adipic acid, azelaic acid, fumaric acid, maleic acid, pimelic acid, suberic acid, sebacic acid, phthalic acid, terephthalic acid, isophthalic acid, dimer acid, pyromellitic acid, other low-molecular-weight carboxylic acid, oligomeric acid, castor oil, hydroxycarboxylic acid such as a reaction product of castor oil and ethylene glycol (or propylene glycol), and the like.

In addition, specific examples of the lactone polyols include compounds obtained by ring-opening polymerization of a lactone such as ε-caprolactone, α-methyl-ε-caprolactone, ε-methyl-ε-caprolactone, or the like with a suitable polymerization initiator, and having hydroxy groups at both ends.

Specific examples of other polyol include acrylic polyol; polybutadiene polyol; polymeric polyol having carbon-carbon bonds on a main chain skeleton, such as hydrogenated polybutadiene polyol; and the like.

In the present technology, the various polyol compounds exemplified above may be used alone or may be used in a combination of two or more types.

Among these, the polyol compound is preferably polypropylene glycol from the perspectives of achieving excellent balance of hardness and breaking elongation of the polyurethane composition of the present technology containing the resulting urethane prepolymer (A) as well as achieving excellent balance of cost.

Furthermore, a polyol with a weight average molecular weight of approximately 100 to 10000 is preferable, and a polyol with a weight average molecular weight of 1000 to 5000 is more preferable. When the weight average molecular weight is within this range, the physical properties (e.g. hardness, breaking strength, and breaking elongation) and the viscosity of the resulting urethane prepolymer (A) become favorable.

Specific examples of the polyamine compound include aliphatic polyamines such as ethylenediamine, propylenediamine, butylenediamine, diethylenetriamine, tri ethylenetriamine, tri ethylenetetramine, tetraethylenepentamine, pentaethylenehexamine, hexamethylenediamine, trimethylhexamethylenediamine, 1,2-propanediamine, iminobispropylamine, methyliminobispropylamine, and 1,5-diamino-2-methylpentane (MPMD, manufactured by Dupont K.K.); aromatic polyamines such as meta-phenylenediamine, ortho-phenylenediamine, para-phenylenediamine, m-xylylenediamine (MXDA), diaminodiphenyl methane, diaminodiphenyl sulfone, and diamino diethyldiphenylmethane; N-aminoethylpiperazine; monoamine having an ether bond in its main chain, such as 3-butoxyisopropylamine; diamines having a polyether backbone, that is exemplified by JEFFAMINE EDR148 manufactured by Sun Techno Chemicals Co., Ltd.; alicyclic polyamines such as isophoronediamine, 1,3-bisaminomethylcyclohexane (1,3BAC, manufactured by Mitsubishi Gas Chemical Company, Inc.), 1-cyclohexylamino-3-aminopropane, and 3-aminomethyl-3,3,5-trimethyl-cyclohexylamine; diamines having a norbornane backbone, such as norbornanediamine (NBDA, manufactured by Mitsui Chemicals, Inc.); polyamide amines having an amino group at a molecular terminal of polyamide; 2,5-dimethyl-2,5-hexamethylene diamine, menthenediamine, 1,4-bis(2-amino-2-methylpropyl)piperazine, JEFFAMINE D230 and JEFFAMINE D400, manufactured by Sun Techno Chemicals Co., Ltd., having polypropylene glycol (PPG) as a backbone; and the like. These polyamine compounds may be used alone or may be used in a combination of two or more types.

Among these, diamine having a polyether backbone (JEFFAMINE) and hexamethylene diamine are preferable.

Crosslinking Agent (B)

The crosslinking agent (B) used in the polyurethane composition of the present technology is at least one type selected from the group consisting of isocyanurate of hexamethylene diisocyanate (hereinafter, also abbreviated as "HDI") (b1), biuret of HDI (b2), a reaction product of HDI with trimethylolpropane (hereinafter, also abbreviated as "TMP") (b3), and a reaction product of HDI with glycerin (b4).

In the present technology, by containing a predetermined amount of such a crosslinking agent (B), the polyurethane composition of the present technology achieves high shear modulus, excellent adhesion under high-temperature high-humidity environments, and good storage stability.

It is conceived that this effect is caused by enhancement of compatibility of the crosslinking agent (B) and the urethane prepolymer (A) described above, structure (size) of the crosslinking agent (B), the number of functional groups (isocyanate groups), and difference in reactivity to the isocyanate group contained in the urethane prepolymer (A).

Furthermore, since this effect is not exhibited in Comparative Examples 2 to 9, in which the content is out of the predetermined range, described below, and is not exhibited in Comparative Example 18 which uses an isocyanate silane compound described in Patent Document 1, it is conceived that this effect is a highly unexpected effect.

Isocyanurate (b1)

The isocyanurate of HDI (b1) is a compound represented by formula (1) below.

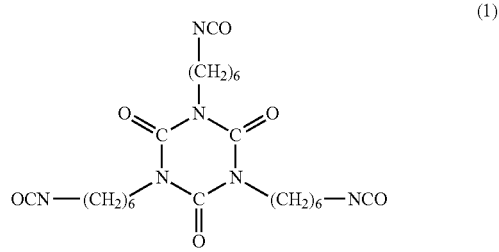

(1)

Biuret (b2)

The biuret of HDI (b2) is a compound represented by formula (2) below.

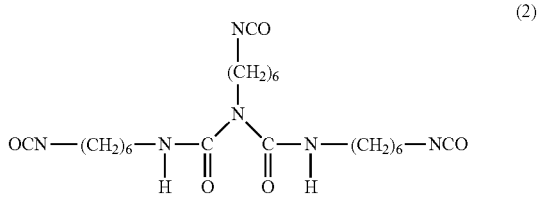

(2)

Reaction Product (b3)

The reaction product of HDI and TMP (b3) preferably has three isocyanate groups, and for example, a compound represented by formula (3) below is favorably exemplified.

The reaction of HDI and TMP is preferably performed by mixing HDI and TMP in a manner that the equivalent weight proportion of isocyanate groups/hydroxide group (the number of isocyanate groups per one hydroxide group) (hereinafter, referred to as "NCO/OH") is from 1.8 to 2.2.

The preparation of the reaction product of HDI and TMP (b3) can be performed with the same method as that used in typical preparation of a urethane prepolymer. For example, the preparation can be performed by stirring HDI and TMP in the equivalent weight proportion described above while heating at a temperature of 50° C. to 100° C. Note that urethanization catalysts, such as organotin compounds, organic bismuth, and amine, can be also used as necessary.

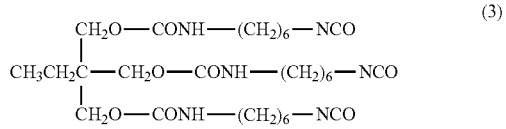

(3)

Reaction Product (b4)

The reaction product of HDI and glycerin (b4) preferably has three isocyanate groups, and for example, a compound represented by formula (4) below is favorably exemplified.

The reaction of HDI and glycerin is preferably performed by mixing HDI and glycerin in a manner that the equivalent weight proportion of isocyanate groups/hydroxide group (the number of isocyanate groups per one hydroxide group) (hereinafter, referred to as "NCO/OH") is from 1.8 to 2.2.

The preparation of the reaction product of HDI and glycerin (b4) can be performed with the same method as that used in typical preparation of a urethane prepolymer. For example, the preparation can be performed by stirring HDI and glycerin in the equivalent weight proportion described above while heating at a temperature of 50° C. to 100° C. Note that urethanization catalysts, such as organotin compounds, organic bismuth, and amine, can be also used as necessary.

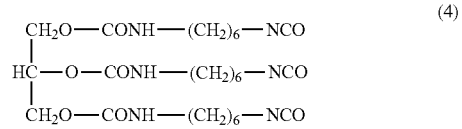

(4)

In the present technology, from the perspectives of achieving good balance of shear modulus and storage stability of the polyurethane composition of the present technology, among the crosslinking agent (B) described above, a combined use of the isocyanurate of HDI (b1) and the reaction product of HDI and glycerin (b4) is preferable.

Furthermore, in the present technology, the content of the crosslinking agent (B) is from 8 to 20 parts by mass, and preferably from 10 of 18 parts by mass, per 100 parts by mass of the urethane prepolymer (A).

Carbon Black (C)

The carbon black (C) used in the polyurethane composition of the present technology can be a conventionally known carbon black that is also used in a typical one-part polyurethane composition.

Examples of the carbon black (C) include SAF (Super Abrasion Furnace), ISAF (Intermediate Super Abrasion Furnace), HAF (High Abrasion Furnace), FEF (Fast Extruding Furnace), GPF (General Purpose Furnace), SRF (Semi-Reinforcing Furnace), FT (Fine Thermal), MT (Medium Thermal), and the like.

Specifically, Seast 9 (manufactured by Tokai Carbon Co., Ltd.) as the SAF, Showa Black N 220 (manufactured by Showa Cabot K.K.) as the ISAF, Seast 3 (manufactured by Tokai Carbon Co., Ltd.) as the HAF, HTC #100 (manufactured by Chubu Carbon K.K.) as the FEF, and the like are exemplified. Furthermore, Asahi #55 (manufactured by Asahi Carbon Co., Ltd.) and Seast 5 (manufactured by Tokai Carbon Co., Ltd.) as the GPF, Asahi #50 (manufactured by Asahi Carbon Co., Ltd.) and Mitsubishi #5 (manufactured by Mitsubishi Chemical Corporation) as the SRF, Asahi Thermal (manufactured by Asahi Carbon Co., Ltd.) and HTC #20 (manufactured by Chubu Carbon K.K.) as the FT, Asahi #15 (manufactured by Asahi Carbon Co., Ltd.) as the MT, and the like are exemplified.

In the present technology, the content of the carbon black (C) is preferably from 20 to 100 parts by mass, and more preferably from 30 to 80 parts by mass, per 100 parts by mass of the urethane prepolymer (A).

Catalyst (D)

The catalyst (D) used in the polyurethane composition of the present technology can be a conventionally known curing catalyst that is also used in a typical one-part polyurethane composition.

Specific examples of the catalyst (D) include lead octylate; tin catalysts such as dioctyltin dilaurate, dibutyltin laurate, and tin octylate; tertiary amines such as trimethylamine, triethylamine, tripropylamine, tributylamine, triamylamine, trihexylamine, trioctylamine, trilaurylamine, dimethylethylamine, dimethylpropylamine, dimethylbutylamine, dimethylamylamine, dimethylhexylamine, dimethylcyclohexylamine, dimethyloctylamine, dimethyllaurylamine, triallylamine, tetramethylethylenediamine, triethylenediamine, N-methylmorpholine, 4,4'-(oxydi-2,1-ethanediyl)bis-morpholine, N,N-dimethylbenzylamine, pyridine, picoline, dimethylaminomethylphenol, trisdimethylaminomethylphenol, 1,8-diazabicyclo[5.4.0]undecene-1,1,4-diazabicyclo[2.2.2]octane, triethanolamine, N,N'-dimethylpiperazine, tetramethyl butanediamine, bis(2,2-morpholinoethyl)ether, bis(dimethylaminoethyl)ether, and the like. These may be used alone, or two or more types of these may be used in combination.

The content of the catalyst (D) is preferably from 0.001 to 1.0 parts by mass, and more preferably from 0.01 to 0.5 parts by mass, per 100 parts by mass of the urethane prepolymer (A).

Optional Component

The polyurethane composition of the present technology may contain, if necessary, various additives, in a range that does not inhibit the object of the present technology, such as fillers other than carbon black, plasticizers, antiaging agents, antioxidants, pigments (dyes), thixotropic agents, ultraviolet absorbers, flame retardants, surfactants (including leveling agents), dispersing agents, dehydrating agents, adhesion promoters, and antistatic agents.

Examples of the fillers other than carbon black include organic or inorganic fillers of any form. Specific examples include fumed silica, calcined silica, precipitated silica, pulverized silica, molten silica; diatomaceous earth; iron oxide, zinc oxide, titanium oxide, barium oxide, magnesium oxide; calcium carbonate, heavy calcium carbonate, precipitated calcium carbonate (light calcium carbonate), colloidal calcium carbonate, magnesium carbonate, zinc carbonate; pyrophyllite clay, kaolin clay, calcined clay; fatty acid treated products, resin acid treated products, urethane compound treated products, and fatty acid ester treated products thereof; and the like. One type of these may be used alone, or two or more types of these may be used in combination.

Specific examples of the plasticizer include diisononyl phthalate (DINP); dioctyl adipate, isodecyl succinate; diethylene glycol dibenzoate, pentaerythritol ester; butyl oleate, methyl acetyl ricinoleate; tricresyl phosphate, trioctyl phosphate; propylene glycol adipate polyester, butylene glycol adipate polyester, and the like. One type of these may be used alone, or two or more types of these may be used in combination.

Specific examples of the antiaging agent include compounds such as hindered phenol compounds and the like.

Specific examples of the antioxidant include butylhydroxytoluene (BHT), butylhydroxyanisole (BHA), and the like.

Specific examples of the pigment include inorganic pigments such as titanium oxide, zinc oxide, ultramarine, iron red, lithopone, lead, cadmium, iron, cobalt, aluminum, hydrochlorides, and sulfates; and organic pigments such as azo pigments, phthalocyanine pigments, quinacridone pigments, quinacridonequinone pigments, dioxazine pigments, anthrapyrimidine pigments, anthanthrone pigments, indanthrone pigments, flavanthrone pigments, perylene pigments, perinone pigments, diketopyrrolopyrrole pigments, quinonaphthalone pigments, anthraquinone pigments, thioindigo pigments, benzimidazolone pigments, isoindoline pigment, and carbon black; and the like.

Specific examples of the thixotropic agent include Aerosil (manufactured by Nippon Aerosil), Disparlon (manufactured by Kusumoto Chemicals, Ltd.), and the like.

Specific examples of the adhesion promoter include terpene resins, phenol resins, terpene-phenol resins, rosin resins, xylene resins, and the like.

Specific examples of the flame retardant include chloroalkyl phosphates, dimethyl-methyl phosphates, bromine-phosphorus compounds, ammonium polyphosphates, neopentyl bromide polyethers, brominated polyethers, and the like.

Specific examples of the antistatic agent include quaternary ammonium salts; hydrophilic compounds such as polyglycols, ethylene oxide derivatives; and the like.

The method of producing the polyurethane composition of the present technology is not particularly limited. For example, the polyurethane composition can be produced by blending the above-described urethane prepolymer (A), crosslinking agent (B), carbon black (C), and catalyst (D) as well as various additives that may be added as desired, blending the mixture sufficiently at room temperature or while heating the mixture (40 to 60° C., e.g. 40° C.) using a roll, kneader, extruder, all-purpose stirrer, and the like to disperse (knead) the mixture uniformly.

EXAMPLES

The polyurethane composition of the present technology will be described in detail below with reference to examples. However, the present technology is not limited to these examples.

Urethane Prepolymer (A)

Urethane prepolymer in which the content of isocyanate group was 1.95% was synthesized by mixing 500 g of polyoxypropylene diol (average molecular weight: 2000), 750 g of polyoxypropylene triol (average molecular weight: 5000), and 214 g of 4,4'-diisocyanate phenylmethane (molecular weight: 250) (at this time, NCO/OH=1.8), further adding 160 g of diisononyl phthalate, and stirring in an nitrogen gas stream at 80° C. for 24 hours to allow reaction to occur.

Crosslinking Agent (B)

Isocyanurate (b1)

As the isocyanurate of HDI (b1), an HDI isocyanurate (D170N, manufactured by Mitsui-Takeda Urethane Chemicals) represented by formula (1) above was used.

Biuret (b2)

As the biuret of HDI (b2), an HDI biuret (D165N, manufactured by Mitsui-Takeda Urethane Chemicals) represented by formula (2) above was used.

Reaction Product (b3)

As the reaction product (b3), an HDI-TMP adduct (synthesized product) represented by formula (3) above was used. Note that the synthesis was performed by adding TMP dropwise to a flask, in which HDI was added in advance, at an equivalent weight proportion of NCO/OH of 2.0, while HDI is being stirred, and then allowing a reaction to occur at 80° C. for 24 hours.

Reaction Product (b4)

As the reaction product (b4), an HDI-glycerin adduct (synthesized product) represented by formula (4) above was used. Note that the synthesis was performed by adding glycerin dropwise to a flask, in which HDI was added in advance, at an equivalent weight proportion of NCO/OH of 2.0, while HDI is being stirred, and then allowing a reaction to occur at 80° C. for 24 hours.

Compound (e1)

As the compound (e1), polyphenyl isocyanate (PAPI135, manufactured by The Dow Chemical Company) was used.

Compound (e2)

As the compound (e2), isocyanurate of tolylene diisocyanate (Desmodur 1351, manufactured by Bayer) was used.

Compound (e3)

As the compound (e3), a TDI-TMP adduct (synthesized product) was used. Note that the synthesis was performed by adding TMP dropwise to a flask, in which TDI was added in advance, at an equivalent weight proportion of NCO/OH of 2.0, while TDI is being stirred, and then allowing a reaction to occur at 80° C. for 10 hours.

Compound (e4)

As the compound (e4), an MDI-TMP adduct (synthesized product) was used. Note that the synthesis was performed by adding TMP dropwise to a flask, in which MDI was added in advance, at an equivalent weight proportion of NCO/OH of 2.0, while MDI is being stirred, and then allowing a reaction to occur at 80° C. for 10 hours.

Compound (e5)

An isocyanate silane compound was synthesized by adding secondary amino group-containing alkoxysilane (Y-9669, manufactured by Nippon Unicar Co, Ltd.) dropwise to a flask, in which the HDI-TMP adduct (the synthesized product described above) represented by formula (3) above was added in advance, at an equivalent weight proportion of NCO/OH of 3.0, while the HDI-TMP adduct is being stirred, and then allowing a reaction to occur at 50° C. for 7 hours.

Working Examples 1 to 18 and Comparative Examples 1 to 18

The components shown in Table 1 below were blended in a mixer according to the compositions (part by mass) shown in Table 1 to obtain the polyurethane compositions shown in Table 1.

Shear Modulus

Each of the prepared polyurethane compositions was coated on a steel plate (width: 25 mm, length: 70 mm) in a manner that the thickness was 5 mm, width was 25 mm, and length was 8 mm. After another steel plate having the same size was stacked thereon, the assembly was cured to produce a test piece.

The produced test piece was pulled for 1 mm at a rate of 10 mm/minute, and the maximum slope of the stress-strain curve obtained thereby was used as the shear modulus. The results are shown in Table 1 below.

Note that the shear modulus is evaluated as "high" if the value of the modulus is 10.0 MPa or greater.

Adhesion

Beads of the prepared polyurethane composition (φ10 mm) were coated on an adherend (glass coated with a primer (MS-90, manufactured by The Yokohama Rubber Co., Ltd.)), and the assembly was compression-bonded in a manner that the thickness became 3 mm, and cured to produce a test piece. Note that the curing was performed by leaving the assembly under a condition at 20° C. and 60% RH for 3 hours, and then immersing the assembly in warm water at 40° C. for 24 hours.

Hand peeling test was performed by cutting the produced test piece with a knife.

As a result of the hand peeling test, the case where the entire polyurethane composition (cured product) underwent cohesive failure and did not cause interfacial failure was evaluated as achieving excellent adhesion and indicated as "CF", and the case where peeling was observed for a part or entire interface (the interface between the primer and the cured product) was evaluated as exhibiting poor adhesion and indicated as "PS". The results are shown in Table 1 below.

Storage Stability

Each of the prepared polyurethane composition was placed in a container, sealed, and stored for 7 days at 40° C. Thereafter, SOD viscosity (Pa·s) was measured, and the rate of the viscosity increase was calculated using the SOD viscosity prior to the storage. The results are shown in Table 1 below.

Note that the SOD viscosity was measured using a pressure viscometer (ASTM D 1092) in accordance with JASO M338-89.

Note that the storage stability is evaluated as "excellent" if the rate of the viscosity increase is less than 25%.

| Table 1-1 | | Comparative Examples | | | | | |
|---|---|---|---|---|---|---|---|
| | | 1 | 2 | 3 | 4 | 5 | 6 |
| Urethane prepolymer (A) | | 100 | 100 | 100 | 100 | 100 | 100 |
| Carbon black (C) | | 40 | 40 | 40 | 40 | 40 | 40 |
| Catalyst (D) | | 1 | 1 | 1 | 1 | 1 | 1 |
| Plasticizer | | 40 | 40 | 40 | 40 | 40 | 40 |
| Calcium carbonate | | 30 | 30 | 30 | 30 | 30 | 30 |
| Crosslinking agent (B) | Isocyanurate (b1) | | 7 | | | | 21 |
| | Biuret (b2) | | | 7 | | | |
| | Reaction product (b3) | | | | 7 | | |
| | Reaction product (b4) | | | | | 7 | |
| Compound (e1): PAPI | | | | | | | |
| Compound (e2): TDI isocyanurate | | | | | | | |
| Compound (e3): TDI—TMP | | | | | | | |
| Compound (e4): MDI—TMP | | | | | | | |
| Compound (e5): isocyanate silane compound | | | | | | | |
| Composition characteristics | Shear modulus (MPa) | 3.1 | 8.5 | 7.9 | 8.8 | 9.1 | 16.8 |
| | Adhesion | CF | CF | CF | CF | CF | PS |
| | Storage stability(%) | 12 | 18 | 15 | 19 | 18 | 21 |

| Table 1-2 | | Comparative Examples | | | | | |
|---|---|---|---|---|---|---|---|
| | | 7 | 8 | 9 | 10 | 11 | 12 |
| Urethane prepolymer (A) | | 100 | 100 | 100 | 100 | 100 | 100 |
| Carbon black (C) | | 40 | 40 | 40 | 40 | 40 | 40 |
| Catalyst (D) | | 1 | 1 | 1 | 1 | 1 | 1 |
| Plasticizer | | 40 | 40 | 40 | 40 | 40 | 40 |
| Calcium carbonate | | 30 | 30 | 30 | 30 | 30 | 30 |
| Crosslinking agent (B) | Isocyanurate (b1) | | | | | | |
| | Biuret (b2) | 21 | | | | | |
| | Reaction product (b3) | | 21 | | | | |
| | Reaction product (b4) | | | 21 | | | |
| Compound (e1): PAPI | | | | | 5 | | |
| Compound (e2): TDI isocyanurate | | | | | | 5 | |
| Compound (e3): TDI—TMP | | | | | | | 5 |
| Compound (e4): MDI—TMP | | | | | | | |
| Compound (e5): isocyanate silane compound | | | | | | | |
| Composition characteristics | Shear modulus (MPa) | 17.5 | 15.2 | 16.9 | 9.5 | 11.2 | 10.3 |
| | Adhesion | PS | PS | PS | PS | PS | PS |
| | Storage stability(%) | 20 | 20 | 19 | 28 | 24 | 25 |

| Table 1-3 | | Comparative Examples | | | | | |
|---|---|---|---|---|---|---|---|
| | | 13 | 14 | 15 | 16 | 17 | 18 |
| Urethane prepolymer (A) | | 100 | 100 | 100 | 100 | 100 | 100 |
| Carbon black (C) | | 40 | 40 | 40 | 40 | 40 | 40 |
| Catalyst (D) | | 1 | 1 | 1 | 1 | 1 | 1 |

-continued

| | | | | | | | |
|---|---|---|---|---|---|---|---|
| Plasticizer | | 40 | 40 | 40 | 40 | 40 | 40 |
| Calcium carbonate | | 30 | 30 | 30 | 30 | 30 | 30 |
| Crosslinking agent (B) | Isocyanurate (b1) | | | | | | |
| | Biuret (b2) | | | | | | |
| | Reaction product (b3) | | | | | | |
| | Reaction product (b4) | | | | | | |
| Compound (e1): PAPI | | | 10 | | | | |
| Compound (e2): TDI isocyanurate | | | | 10 | | | |
| Compound (e3): TDI—TMP | | | | | 10 | | |
| Compound (e4): MDI—TMP | | 5 | | | | 10 | |
| Compound (e5): isocyanate silane compound | | | | | | | 10 |
| Composition characteristics | Shear modulus (MPa) | 9.6 | 18.9 | 18.3 | 16.4 | 20.7 | 8.3 |
| | Adhesion | PS | PS | PS | PS | PS | CF |
| | Storage stability(%) | 30 | 35 | 30 | 28 | 30 | 15 |

| | | Working Example | | | | | |
|---|---|---|---|---|---|---|---|
| Table 1-4 | | 1 | 2 | 3 | 4 | 5 | 6 |
| Urethane prepolymer (A) | | 100 | 100 | 100 | 100 | 100 | 100 |
| Carbon black (C) | | 40 | 40 | 40 | 40 | 40 | 40 |
| Catalyst (D) | | 1 | 1 | 1 | 1 | 1 | 1 |
| Plasticizer | | 40 | 40 | 40 | 40 | 40 | 40 |
| Calcium carbonate | | 30 | 30 | 30 | 30 | 30 | 30 |
| Crosslinking agent (B) | Isocyanurate (b1) | 8 | | | | 20 | |
| | Biuret (b2) | | 8 | | | | 20 |
| | Reaction product (b3) | | | 8 | | | |
| | Reaction product (b4) | | | | 8 | | |
| Compound (e1): PAPI | | | | | | | |
| Compound (e2): TDI isocyanurate | | | | | | | |
| Compound (e3): TDI—TMP | | | | | | | |
| Compound (e4): MDI—TMP | | | | | | | |
| Compound (e5): isocyanate silane compound | | | | | | | |
| Composition characteristics | Shear modulus (MPa) | 10.3 | 11.2 | 11.6 | 10.5 | 17.5 | 16.3 |
| | Adhesion | CF | CF | CF | CF | CF | CF |
| | Storage stability (%) | 17 | 18 | 15 | 18 | 24 | 24 |

| | | Working Example | | | | | |
|---|---|---|---|---|---|---|---|
| Table 1-5 | | 7 | 8 | 9 | 10 | 11 | 12 |
| Urethane prepolymer (A) | | 100 | 100 | 100 | 100 | 100 | 100 |
| Carbon black (C) | | 40 | 40 | 40 | 40 | 40 | 40 |
| Catalyst (D) | | 1 | 1 | 1 | 1 | 1 | 1 |
| Plasticizer | | 40 | 40 | 40 | 40 | 40 | 40 |
| Calcium carbonate | | 30 | 30 | 30 | 30 | 30 | 30 |
| Crosslinking agent (B) | Isocyanurate (b1) | | | 4 | 4 | 4 | |
| | Biuret (b2) | | | 4 | | | 4 |
| | Reaction product (b3) | 20 | | | 4 | | 4 |
| | Reaction product (b4) | | 20 | | | 4 | |
| Compound (e1): PAPI | | | | | | | |
| Compound (e2): TDI isocyanurate | | | | | | | |
| Compound (e3): TDI—TMP | | | | | | | |
| Compound (e4): MDI—TMP | | | | | | | |
| Compound (e5): isocyanate silane compound | | | | | | | |
| Composition characteristics | Shear modulus (MPa) | 15.2 | 15.8 | 10.3 | 11.1 | 12.3 | 10.9 |
| | Adhesion | CF | CF | CF | CF | CF | CF |
| | Storage stability (%) | 23 | 24 | 18 | 17 | 15 | 14 |

| | | Working Example | | | | | |
|---|---|---|---|---|---|---|---|
| Table 1-6 | | 13 | 14 | 15 | 16 | 17 | 18 |
| Urethane prepolymer (A) | | 100 | 100 | 100 | 100 | 100 | 100 |
| Carbon black (C) | | 40 | 40 | 40 | 40 | 40 | 40 |
| Catalyst (D) | | 1 | 1 | 1 | 1 | 1 | 1 |
| Plasticizer | | 40 | 40 | 40 | 40 | 40 | 40 |
| Calcium carbonate | | 30 | 30 | 30 | 30 | 30 | 30 |
| Crosslinking agent (B) | Isocyanurate (b1) | 2 | 10 | 10 | 10 | | 5 |
| | Biuret (b2) | 2 | 10 | | | 10 | 5 |
| | Reaction product (b3) | 2 | | 10 | | 10 | 5 |
| | Reaction product (b4) | 2 | | | 10 | | 5 |
| Compound (e1): PAPI | | | | | | | |
| Compound (e2): TDI isocyanurate | | | | | | | |
| Compound (e3): TDI—TMP | | | | | | | |
| Compound (e4): MDI—TMP | | | | | | | |
| Compound (e5): isocyanate silane compound | | | | | | | |

-continued

| Composition characteristics | Shear modulus (MPa) | 11.7 | 17.3 | 16.3 | 16.8 | 17.2 | 15.7 |
|---|---|---|---|---|---|---|---|
| | Adhesion | CF | CF | CF | CF | CF | CF |
| | Storage stability (%) | 12 | 23 | 24 | 24 | 24 | 22 |

Among the components shown in Table 1 above, components other than the urethane prepolymer (A), the crosslinking agent (B), and the compound (e1) to the compound (e5) described above are as follows.

Carbon black (C): N220 (manufactured by NSCC Carbon Co., Ltd.)
Catalyst (D): dioctyltin laurate (NEOSTANN U-810, manufactured by Nitto Kasei Co., Ltd.)
Plasticizer: diisononyl phthalate (DINP, manufactured by J-PLUS Co., Ltd.)
Calcium carbonate: heavy calcium carbonate (Super S, manufactured by Maruo Calcium Co., Ltd.)

From the result shown in Table 1 above, it was found that all of Comparative Example 1, which was prepared without compounding the crosslinking agent (B), and Comparative Examples 2 to 5, in which 7 parts by mass of the crosslinking agent (B) was compounded, exhibited low shear modulus.

Furthermore, Comparative Examples 6 to 9, in which 21 parts by mass of the crosslinking agent (B) was compounded, exhibited poor adhesion under high-temperature high-humidity environments.

Furthermore, in Comparative Examples 10 to 18, in which a compound that is not equivalent to the crosslinking agent (B) was compounded, at least one physical property among shear modulus, adhesion under high-temperature high-humidity environments, or storage stability was deteriorated regardless of whether the added amount thereof was from 8 to 20 parts by mass or not.

On the other hand, all of Working Examples 1 to 18, in which from 8 to 20 parts by mass of the crosslinking agent (B) was compounded, achieved high shear modulus, excellent adhesion under high-temperature high-humidity environments, and good storage stability.

In particular, it was found that Working Example 11, in which isocyanurate of HDI (b1) and a reaction product of HDI and glycerin (b4) were used in combination among the above described crosslinking agent (B), achieved good balance of shear modulus and storage stability.

What is claimed is:

1. A one-part moisture-curable polyurethane composition comprising: a urethane prepolymer (A), a crosslinking agent (B), carbon black (C), and a catalyst (D);
   the crosslinking agent (B) being at least one type selected from the group consisting of isocyanurate of hexamethylene diisocyanate (b1), biuret of hexamethylene diisocyanate (b2), a reaction product of hexamethylene diisocyanate with trimethylolpropane (b3), and a reaction product of hexamethylene diisocyanate with glycerin (b4); and
   a content of the crosslinking agent (B) being from 8 to 20 parts by mass per 100 parts by mass of the urethane prepolymer (A), wherein the crosslinking agent (B) is a combination of the isocyanurate (b1) and the reaction product (b4).

* * * * *